Jan. 11, 1944.   F. FIEDLER   2,338,921
REAR AXLE FOR MOTOR VEHICLES
Filed Dec. 23, 1939   2 Sheets-Sheet 1
Fig. 1
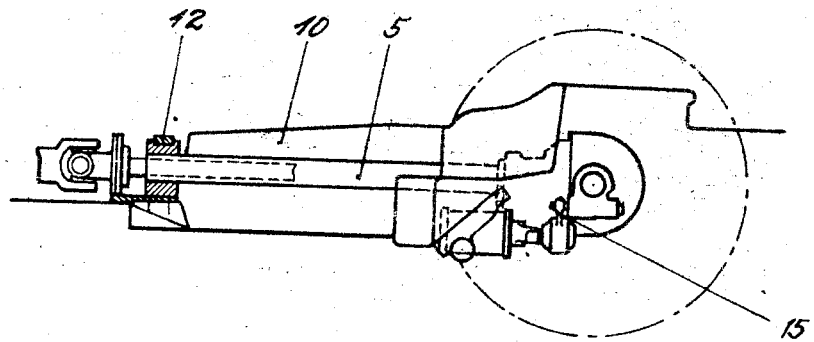
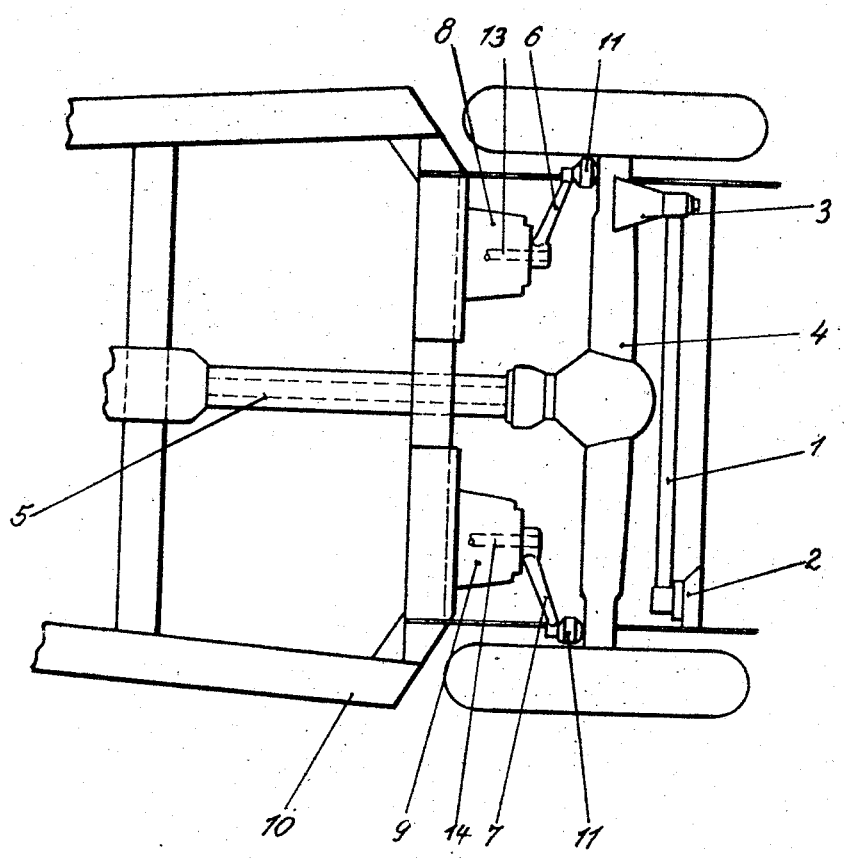
Fig. 2
INVENTOR:
FRITZ FIEDLER
by
ATTORNEYS

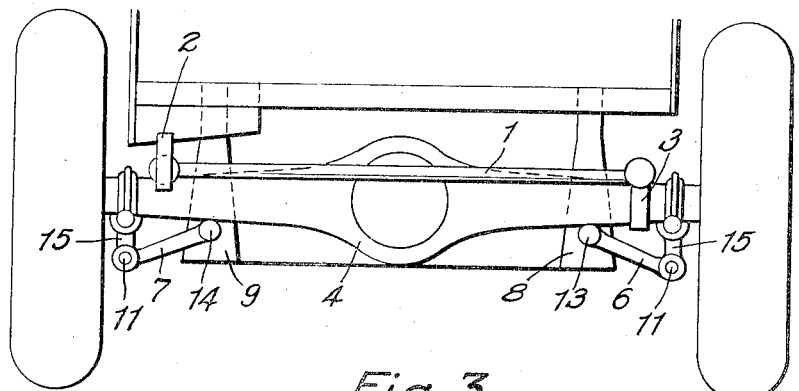
Fig. 3.
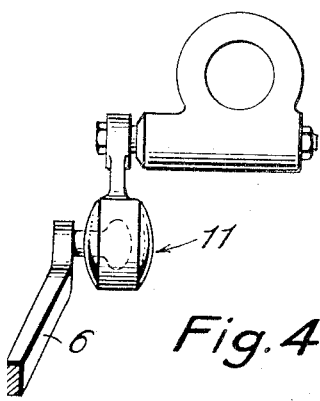
Fig. 4.
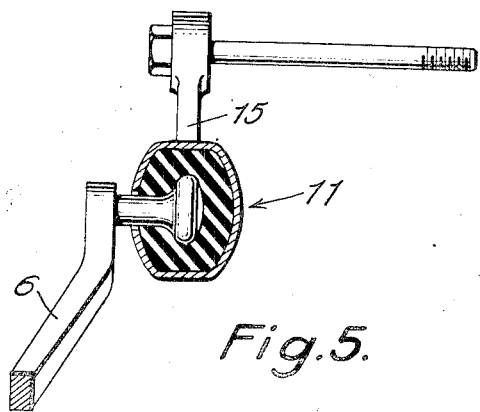
Fig. 5.
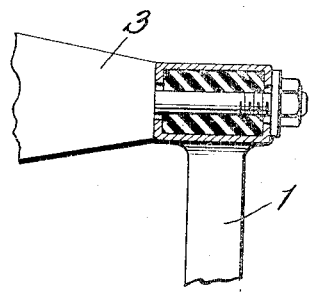
Fig. 6.
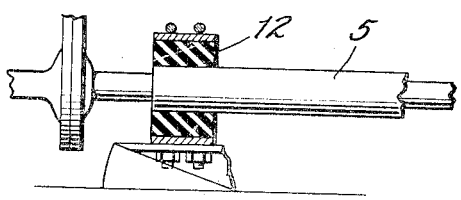
Fig. 7.
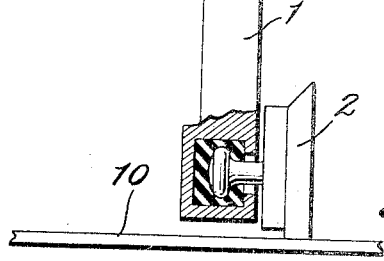
Inventor.
Fritz Fiedler
By Attorney.

Patented Jan. 11, 1944

2,338,921

UNITED STATES PATENT OFFICE 2,338,921

REAR AXLE FOR MOTOR VEHICLES

Fritz Fiedler, Munich, Germany; vested in the Alien Property Custodian

Application December 23, 1939, Serial No. 310,799
In Germany January 5, 1939

4 Claims. (Cl. 180—85)

This invention relates to a rear axle for motor vehicles, and more particularly to an improved arrangement for interconnecting the axle with the vehicle frame.

An object of this invention is to eliminate the transmission of noises from the rear axle to within the passenger space of a vehicle.

Another object of this invention is to eliminate the transmission of shocks from the rear axle to the vehicle frame.

Still another object of this invention is to transmit the longitudinal thrust forces between the rear axle and frame through yieldable supports.

A further object of this invention is to so separate and distribute the longitudinal and transverse forces arising between the drive axle and the frame as to permit the use of yieldable interconnecting means to absorb vibrations and shocks.

A more specific object of this invention is to provide an arrangement for interconnecting a drive axle with the vehicle frame, in which the transverse centrifugal forces are transmitted by a transverse bar and the longitudinal forces are divided between a thrust tube and the spring suspension.

With these and incidental objects in view, the invention consists in certain novel features of construction and combination of parts which are set forth in the appended claims, and a preferred form of embodiment whereof is hereinafter described with reference to the drawings which accompany and form part of the specification, wherein:

Fig. 1 is a side elevation with parts broken away and shown in section;

Fig. 2 is a top view of the connection of a rigid drive axle of a motor vehicle with the frame according to the invention;

Fig. 3 is a rear elevation;

Fig. 4 is a detail perspective view of one of the supporting links;

Fig. 5 is a similar view of Fig. 4 with parts broken away and shown in section;

Fig. 6 is a detail plan view of the transverse bar with the yieldable mountings of its respective end portions shown in section; and Fig. 7 is an enlarged detail vertical section showing the mounting of the forward extremity of the thrust tube upon the frame.

In the arrangement according to the invention the centrifugal forces are transmitted by a bar 1 for supporting the centrifugal forces arranged transversely to the direction of travel, and connected on the one hand through the bearing 3 with the rigid axle 4 and on the other hand through the bearing 2 with the frame 10. The transmission of the longitudinal thrust forces is effected at three points, viz., through the center thrust tube 5, which on the one hand is rigidly connected with the rear axle 4 and on the other hand articulated with the frame 10, and through the levers 6 and 7, serving for the suspension of the chassis frame 10 at the drive axle 4 and swinging transversely to the direction of travel. Said levers 6 and 7 are supported by torsion bar springs 13 and 14 in the bearings 8 and 9, and engaged with the links 15 swinging transversely to the direction of travel and arranged vertically to the longitudinal direction of the vehicle, connecting the axle 4 with the levers 6 and 7. By the distribution of the longitudinal thrust forces into three branches, obtained by the arrangement according to the invention, it is possible to use as support an elastic rubber cushion 12 for the transmission of the support reactions of the center thrust tube 5 to the chassis frame 10, as well as to provide the connection of the two levers of each of the two link pairs of the axle suspension through a yielding journal support 11. The centrifugal force prop 1 is likewise yieldingly connected both with the frame as well as with the axle.

By the use of the axle suspension described above, it is possible to transmit part of the longitudinal thrust forces produced by the brake torque and the drive torque from the vehicle body through the levers of the springing system to the rear axle. A complete transmission of the occurring longitudinal thrust forces to this axle suspension, however, would not be convenient insofar as this would require a strengthening of the force transmitting members, such as of the joints and of the levers, and thus necessarily an increase in the unsprung masses. By the combined arrangement according to this invention wherein a center thrust tube is provided, it is possible to make a division in the transmission of the total longitudinal thrust forces, so that the individual transmitting members, such as the two levers and the center thrust tube still have to transmit only a fraction of the total longitudinal thrust forces. In this manner, it is possible to provide for elastic or rubber connecting points of these force transmitting members with the frame or with the axle, and to so avoid effectively a transmission of the axle and drive noises from the chassis frame to the vehicle body, which are usually felt as disagreeable rumbling. According to the invention a yielding support such as a rubber cushion is used for the transmission of the reactions of the center thrust tube to the chassis, and yieldable journal supports for the connection of the two levers of each of the ring pairs of the axle suspension. Additionally, the center thrust tube may be made as long as possible, so that the bearing pressure is still further reduced and thus a safe transmission of force is assured.

By the arrangement of a centrifugal force bar for taking up the transverse forces occurring when negotiating curves, as provided by the combined arrangement according to this invention, the transmission of transverse thrust forces through the connection of the center thrust tube with the chassis frame is avoided. This permits the possibility of providing an elastic support of the center thrust tube at the frame as well as for the elastic connection of the two levers of each of the two link pairs of the axle suspension, as described above, as in this manner these constructional members are entirely free of stressing by transverse forces. Only by the axle suspension used in the combined arrangement according to the invention wherein part of the longitudinal thrust forces can be transmitted by the suspension, it is possible to provide a center thrust tube for the yieldable transmission of the longitudinal forces as an advantageous force transmitting element between the chassis frame and the drive axle for all conditions of service. Since, by the possibility of transmitting forces through the axle suspension, or at a relatively large lateral distance from the center thrust tube, maximum ability in the transmission of longitudinal thrust forces is obtained, a construction which is only realized by the triangular type of support now used in the art and which has been eliminated according to the present construction.

By reason of the separation and distribution of the forces, the various important transmitting points are only stressed in one direction, which permits the use of yieldable material such as rubber at these points, and, of even greater importance, stresses these materials in only one direction which can be arranged to be their direction of maximum resistance. This naturally increases the life of the yieldable joints used.

Having described an illustrative embodiment of the invention, it is pointed out that various changes and modifications therein may be made without departing from the invention as set forth in the claims which follow.

I claim:

1. In a vehicle having a frame and a drive axle, the combination of means for interconnecting said drive axle with said frame, comprising a transverse bar connected at one end to said axle and at its other end to said frame for transmitting transverse or centrifugal forces, a centrally positioned, longitudinally extending thrust tube articulated at its forward end to said frame and rigidly connected at its rear end to said drive axle, a pair of arms pivotally connected at one end to said frame on opposite sides of said vehicle for movement in a transverse direction, means for interconnecting the other end of said arms to respective opposite ends of said axle, said means including links pivotally connected to said other arm end and to said axle for relatively free movement in a transverse direction but held against movement in the longitudinal direction, whereby the driving forces are transmitted from said drive axle to said frame through said arms and links, and rotary spring means interconnected with the ends of said arms pivoted to the frame, for resisting relative vertical movement between said axle and frame.

2. The combination according to claim 1, in which said rotary spring means are torsion rods extending longitudinally of said vehicle.

3. The combination according to claim 1, in which the means for articulating said thrust tube to said frame comprises a yieldable support, and the means for connecting said arms to said drive axle includes journals for said links, yieldable in the transverse direction but relatively rigid in the longitudinal direction.

4. The combination according to claim 1, in which said transverse strut is yieldably interconnected with said frame and with said drive axle.

FRITZ FIEDLER.